Patented June 18, 1935

2,005,371

UNITED STATES PATENT OFFICE 2,005,371

PROCESS FOR THE MANUFACTURE OF TRIPROPIONIN

David C. Hull, Kingsport, Tenn., assignor to Eastman Kodak Company, Rochester, N. Y., a corporation of New York No Drawing. Application August 18, 1934, Serial No. 740,485

4 Claims. (Cl. 260—106)

This invention relates to the manufacture of tripropionin by the esterification of glycerol with propionic acid in the presence of a catalyst, and more particularly to the manufacture of tripropionin by such esterification, in which the water formed is removed by azeotropic distillation with a water-withdrawing agent.

It is known to prepare esters of glycerol by mixing suitable amounts of glycerol, the organic acid with which it is to be esterified, a catalyst, and a water-withdrawing agent, such as an aromatic hydrocarbon, and distilling under such conditions that an azeotropic mixture of the water-withdrawing agent and water distills off. In this way the water formed during the esterification, as well as any water present in the starting materials, is withdrawn from the reaction mixture. The azeotropic mixture which distills over may be continuously separated into its components by merely allowing the mixture to separate into two layers, and the water-withdrawing agent continuously returned to the reaction mixture by allowing it to flow back into the distilling vessel.

This general method has been found useful for preparing tripropionin from glycerol and propionic acid. Sulfuric acid is a suitable catalyst, although other esterification catalysts, such, for instance, as p-toluenesulfonic acid, may be used. A suitable water-withdrawing agent is toluene, although others, such as benzene, xylene, bromobenzene, etc. may be employed. It is desirable to use a slight excess of propionic acid, as propionic acid is sufficiently volatile so that a little of it distills over with the azeotrope, and remains in the water layer when the azeotropic mixture separates.

I have discovered that the yield of tripropionin obtained by esterification of glycerol with propionic acid in the presence of a catalyst, with azeotropic withdrawal of the water formed, may be materially increased by subjecting the mixture of glycerol and propionic acid to a pre-heating before the catalyst is added. The water-withdrawing agent may be present during the pre-heating, but if present, is not allowed to distill off.

As an example of the method of carrying out my process, I may proceed as follows. A charge consisting of 84 lbs. of 95% glycerol, 212 lbs. of 97% propionic acid and 90 lbs. of toluene is weighed out in a copper weigh tank and pre-heated in this tank for about 5 hours at a temperature ranging from about 50° to 80° C. The charge is then dumped into a steam-jacketed Duriron pot, where 231 grams of 96% sulfuric acid is added as catalyst and the mixture is further pre-heated for about 5 hours at about 80° C. Precautions are taken against escape of vapors during both stages of pre-heating. The charge is now transferred to a second steam-jacketed Duriron vessel which is fitted with an agitator and with a plate column, condenser and decanter, and an azeotrope of toluene and water, boiling at approximately 84° C., is distilled off, the reaction mixture being agitated constantly meanwhile. The temperature at the top plate of the column should not exceed 87° C. during the distillation. Some propionic acid is carried over with the azeotrope. In the decanter the azeotrope separates into a toluene upper layer and an aqueous lower layer containing the propionic acid carried over. The toluene is allowed to flow back continuously, through a trap, into the distilling vessel. When no more water distills over with the toluene, the agitation and distillation are discontinued, and the charge is forced over from the Duriron vessel into a wash tank, by means of air pressure.

To obtain the pure tripropionin, the charge in the wash tank is treated with 24 lbs. of sodium carbonate and 8 gallons of water, stirred well, treated with 12 gallons more of water, and stirred again. The aqueous layer is allowed to settle to the bottom, which it does readily, and is drawn off. This treatment removes the sulfuric acid and any free propionic acid remaining with the ester. The toluene-ester mixture is then washed with 8 gallons of water, and the aqueous layer is removed from the top of the washer. The toluene-ester mixture is now run into a vessel containing 25 lbs. of calcium chloride, where it is allowed to dry for several hours, after which it is run into a vacuum still. The toluene is distilled off at a moderately reduced pressure, after which the pressure is reduced to a few millimeters of mercury and the tripropionin distilled over. It distills at about 165° C. under 9 mm. pressure.

I offer no theoretical explanation for the increase in yield brought about by the pre-heating without catalyst. It is known that esterification reactions require a considerable time to reach equilibrium, even when a catalyst is present, and that it is advantageous, from the standpoint of time required by the distillation, to allow the acid and alcohol to stand, with the catalyst, until equilibrium is reached, before beginning to distill off the water formed. However, it is known that the use of a catalyst merely accelerates the reaction, and does not affect the final yield. On the other hand, I have found that by pre-heating the glycerol and propionic acid without catalyst prior to pre-heating with the catalyst, I obtain a yield of tripropionin about 5% nearer the theoretical than is obtained under the same conditions when the pre-heating without catalyst is omitted and the reaction mixture is merely pre-heated with the catalyst before starting the removal of the water by azeotropic distillation. This increase in yield is very important from an economic standpoint, as the starting materials and the distillation and purification processes are expensive, and any increase in efficiency is of great advantage.

It will be understood that the above example is given by way of illustration only, and that I am not to be limited by it except as indicated in the appended claims. For instance, the water-withdrawing agent may or may not be present during the pre-heating. The step of pre-heating with the catalyst may be omitted, and the catalyst added in the distilling vessel.

What I claim as my invention and desire to be secured by Letters Patent of the United States is:

1. In a process of making tripropionin by esterifying glycerol with propionic acid in the presence of a catalyst and removing the water formed by azeotropic distillation with a water-withdrawing agent, the step which comprises heating the glycerol and propionic acid together prior to contact with the catalyst.

2. In a process of making tripropionin by esterifying glycerol with propionic acid in the presence of a catalyst and removing the water formed by azeotropic distillation with a water-withdrawing agent, the step which comprises heating the glycerol, propionic acid and water-withdrawing agent together prior to contact with the catalyst, without withdrawing water.

3. In a process of making tripropionin by esterifying glycerol with propionic acid in the presence of a catalyst and removing the water formed by azeotropic distillation with a water-withdrawing agent, the step which comprises heating the glycerol and propionic acid together for a period of from 3 to 6 hours, approximately, at a temperature of from about 50° C. to 80° C., prior to contact with the catalyst.

4. In a process of making tripropionin by esterifying glycerol with propionic acid in the presence of a catalyst and removing the water formed by azeotropic distillation with a water-withdrawing agent, the step which comprises heating the glycerol, propionic acid and water-withdrawing agent together for a period of from 3 to 6 hours, approximately, at a temperature of from about 50° C. to 80° C., prior to contact with the catalyst, without withdrawing water.

DAVID C. HULL.